(12) United States Patent
Espinasse et al.

(10) Patent No.: US 8,282,315 B2
(45) Date of Patent: Oct. 9, 2012

(54) METHOD OF INSTALLING AN UNDERWATER RISER

(75) Inventors: Philippe Espinasse, Bihorel (FR); Tegwen De Kerdanet, Paris (FR); Louis Fargheon, Paris (FR); Thomas Guilbaud, Colombes (FR)

(73) Assignee: Technip France (FR)

( * ) Notice: Subject to any disclaimer, the term of this patent is extended or adjusted under 35 U.S.C. 154(b) by 203 days.

(21) Appl. No.: 12/918,112

(22) PCT Filed: Feb. 18, 2009

(86) PCT No.: PCT/FR2009/000183
§ 371 (c)(1),
(2), (4) Date: Oct. 1, 2010

(87) PCT Pub. No.: WO2009/118467
PCT Pub. Date: Oct. 1, 2009

(65) Prior Publication Data
US 2011/0020067 A1    Jan. 27, 2011

(30) Foreign Application Priority Data
Feb. 19, 2008   (FR) ..................................... 08 00897

(51) Int. Cl.
*F16L 1/15*   (2006.01)
(52) U.S. Cl. ...................... 405/171; 405/166; 405/168.4
(58) Field of Classification Search .................. 405/158, 405/166, 168.1, 168.4, 171, 172, 173
See application file for complete search history.

(56) References Cited

U.S. PATENT DOCUMENTS

| | | | |
|---|---|---|---|
| 5,807,027 A * | 9/1998 | Ostergaard | 405/170 |
| 6,409,428 B1 * | 6/2002 | Moog | 405/169 |
| 7,654,773 B2 * | 2/2010 | Bastard et al. | 405/172 |

* cited by examiner

*Primary Examiner* — Tara Mayo-Pinnock
(74) *Attorney, Agent, or Firm* — Ostrolenk Faber LLP

(57) ABSTRACT

A method of installing an underwater riser includes anchoring an installation to the seabed; coupling a tubular pipe to the installation; equipping the installation with a submersible float; submerging the float and the pipe, while the float and the pipe are being held from a surface vessel; a cable and a return device are installed on the seabed installation so that the cable can be connected to the pipe; attaching a submerged hauling buoy to the hauling cable; then removing ballast from the float in order to compensate for the tensile forces corresponding to the weight of the float and the pipe and to some of the load applied to the cable; and finally, anchoring of the hauling buoy to the installation and gradually releasing the float.

10 Claims, 2 Drawing Sheets

US 8,282,315 B2

METHOD OF INSTALLING AN UNDERWATER RISER

CROSS REFERENCE TO RELATED APPLICATION

The present application is a 35 U.S.C. §§371 national phase conversion of PCT/FR2009/000183 filed Feb. 18, 2009, which claims priority of French application Ser. No. 08/00897, filed Feb. 19, 2008, the disclosure of which is incorporated by reference herein. The International Application was published in the French Language.

BACKGROUND OF THE INVENTION

The present invention relates to a method of installing an underwater riser for the offshore transportation of hydrocarbons.

More specifically, the invention relates to the installation of risers for extracting and carrying gas or crude oil from a seabed installation connected to submerged well heads, to then lead this gas or crude oil up to a surface installation. These risers comprise at least one vertical pipe connecting the sea bed and the surface, and referred to by its English name "riser", and also a float connected to the top of the pipe to suspend it vertically subsurface and vertically in line with the seabed installation. The pipe has a connecting end intended to be connected to the seabed installation. Furthermore, the top of the pipe is extended by a flexible pipe which leads to the surface installation hanging as a catenary curve under its own weight. Such an installation has already been described in document FR 2 791 316.

There is then the problem of installing these risers. The problem is that subsea oil fields are exploited at increasingly deep depths and it then becomes awkward to install these risers from the water surface, and particularly to guide the connecting end toward the seabed installation in order to connect the two together.

Thus has been conceived the idea of installing a male connection element at the connecting end of the pipe and of anchoring into the sea bed a substantially frustoconical female connection element in which the male connection element can engage. Further, pulling cables are attached to the connecting end and run as far as the female connection element to enter return pulleys. Next, these cables run up to the surface, where they can then be driven via a surface ship. Hence, from the surface, driving the pulling cables through the return pulleys, the connecting end is thereby driven, in the opposite direction, toward the seabed installation and, more specifically, as it nears the bottom, the male element is driven into the female connection element.

Reference may be made to document FR 2 791 316 the subject of which is specifically a method of installing a subsea riser of this type.

However, when the male element engages in the female element in order to make the connection between the connecting end and the seabed installation, it is necessary to pull very slowly and very carefully on the cables from the surface in order not to drive the male element violently into the female element and damage the connecting end. However, the surface ship is often subject to the influence of the waves and currents, or even the wind, which means that the male element is driven toward the female element in an oscillatory manner and therefore strikes it when they are close enough together. This phenomenon, commonly known as "pounding", plays a part in damaging the connecting end.

Another disadvantage lies in a step prior to connecting the connecting end and said seabed installation and whereby said float and said pipe are held by a suspension line from a surface vessel. The float is filled with water so that it can be submerged with the pipe and is held between the bottom and the surface, suspended from the suspension line, which bears tensile forces corresponding to the weight of said float and of said pipe. The connecting end of the pipe is then anchored to the sea bed by moorings some distance from the seabed installation. Next, the float is unballasted so that it takes up the tensile forces corresponding to its own weight and that of said pipe and so as to keep the pipe in a vertical position. However, as soon as the intensity of the force experienced by the suspension line is taken up by the moorings, the vertical movements of the surface vessel which are caused by the waves lead to considerable tensile forces in the assembly extending from the suspension line to the moorings which particularly carry the risk of failing. Furthermore, under certain conditions, the opposing movements of the surface vessel and of the float may also, given their respective inertias, cause the surface vessel to become detached from the float.

SUMMARY OF THE INVENTION

Hence, it is therefore an object of the present invention to solve the aforementioned problems in order to connect the connecting end of the pipe to the seabed installation.

With the aim of solving these problems, the present invention proposes a method of installing a subsea riser for carrying hydrocarbons between a sea bed and a surface, said method being of the type whereby: a seabed installation is anchored to said sea bed; a tubular pipe is supplied which has a connecting end intended to be connected to said seabed installation and an opposite end equipped with a submersible float; then water is permitted to enter said float in order to submerge said float and said tubular pipe vertically in line with said seabed installation, while said float and said pipe are held by a suspension line from a surface vessel, said suspension line bearing tensile forces corresponding to the weight of said float and of said pipe; a pulling cable is next supplied and return means are installed on said seabed installation so that said pulling cable can be connected to said connecting end and said cable can be driven through said return means and, at the same time, said connecting end can be driven toward said seabed installation; according to the invention, a submerged pulling buoy is attached to said pulling cable so as to apply additional tensile forces to said suspension line; next a gaseous fluid is substituted for the water in said float in order to compensate, on the one hand, for the tensile forces corresponding to the weight of said float and of said pipe and, on the other hand, for at least some of the additional tensile forces; and finally said pulling buoy is anchored to said seabed installation and said suspension line is gradually released so that said seabed installation takes up said additional tensile forces applied by the pulling buoy whereas said float applies the remainder of the additional tensile forces to said pipe in order to hold it vertically.

Thus, one feature of the invention lies in the use of the pulling buoy submerged at the subsurface, that is to say between the sea bed and the surface and, more specifically, near the sea bed, for attaching it to the pulling cable then releasing it so that as it rises it can apply additional tensile forces to said suspension line. Specifically, once released, the pulling buoy which then contains a gaseous fluid lighter than water, pulls on the pulling cable and this pull is passed on, in the opposite direction thanks to the return means, to the connecting end of the pipe and thereby to the suspension line running to the surface vessel. Thus, an additional tensile force is applied to the suspension line in addition to the self weight of the pipe and of the float.

Next, by anchoring said pulling buoy to said seabed installation and then releasing or paying out said suspension line gradually from the surface vessel, said float and said tubular pipe are gradually lowered toward the seabed installation because the pulling cable is driven through the return means via the pulling buoy which is itself driven toward the surface. This pulling buoy is, however, held by the mooring that connects it to the seabed installation. From that moment on, the forces applied to the suspension line, between the float and the surface vessel, cancel one another out. The benefit of such an arrangement lies precisely in that as soon as the forces applied to the suspension line tend toward zero and the surface vessel, for example, is driven by the waves in a vertical direction away from the sea bed, the forces then applied to the chain, suspension lines, floats, pipe and pulling cable assembly are then passed on to the pulling buoy which is then driven toward the sea bed. This of course allows all the elements of the aforementioned chain assembly to be spared, because the pulling cable is not anchored to the sea bed as it was in the prior art.

Advantageously, said gaseous fluid, lighter than water, is substituted for the water in said float in order to compensate for the tensile forces corresponding to the weight of said float and substantially to half said additional tensile forces applied via the pulling buoy.

Furthermore, according to one particular embodiment of the invention, in order to connect the connecting end to said seabed installation, said pulling buoy is released from said seabed installation so that said pulling buoy rises up toward said surface in such a way as to drive said connecting end in the opposite direction, toward said seabed installation. To do this, damping means are provided to accept the connecting end as it approaches the seabed installation in a downward direction.

For preference, said pulling buoy is connected to known guide means to guide the ascent of said pulling buoy toward said surface and to control it. These known guide means are, for example, a subsea winch or hoist or alternatively a deadweight. Thus, contact between the connecting end of the pipe and the seabed installation can be better controlled and damage thereto avoided.

Furthermore, said connecting end is advantageously equipped with a male element, whereas said seabed installation is equipped with a female element able to accept said male element.

Thus, the connecting end is guided with respect to its point of connection to the seabed installation even more precisely. In addition, the guide buoy situated at the subsurface is itself driven in a controlled manner and so the pulling cable can be driven without being disturbed by the waves or any other current. This encourages control over the relative position of the connecting end and of the seabed installation. Specifically, whereas surface waters are relatively disturbed, down to a certain depth, below this, neither the waves nor the ocean currents have very much influence on a submerged body. Furthermore, as the pulling buoy rises, the connecting end is driven in the opposite direction toward the seabed installation and, as a result, the float secured to the tubular pipe is itself driven toward the sea bed and thus away from the disturbed surface waters. Thus, it is far easier to control the approach of the connecting end toward the seabed installation and more specifically, the way in which the male element engages in the female element in order to make the connection.

Moreover and particularly advantageously, water is allowed to enter said pulling buoy in order to submerge it and the water in said pulling buoy is discharged to the outside to be replaced with a gaseous fluid so as to release said pulling buoy so that it is driven toward the surface. This means allows the pulling buoy to be submerged easily with the minimum of effort. Quite obviously, in order to do this, the pulling buoy or, alternatively, the surface ship, are fitted with pumps for this purpose.

In addition, cable return means that form a block and tackle are advantageously installed on said seabed installation so as to step down the tensile forces applied by the pulling buoy to the connecting end of the pipe and adjust the relative position of the connecting end and of the seabed installation precisely. Moreover, according to an alternative form of the invention, additional return members secured to a baseplate anchored in the sea bed and some distance from the seabed installation are installed, and said pulling cable is driven both through said return means and through said additional return members. In that way, the driving of the pulling cable is not in any way disturbed during the movement of the connecting end toward the seabed installation as will be explained in greater detail hereinafter.

BRIEF DESCRIPTION OF THE DRAWINGS

Other particular features and advantages of the invention will become apparent from reading the description given hereinafter of one particular embodiment of the invention, provided by way of nonlimiting indication and with reference to the attached drawings in which.

DESCRIPTION OF A PREFERRED EMBODIMENT

Figure 1:
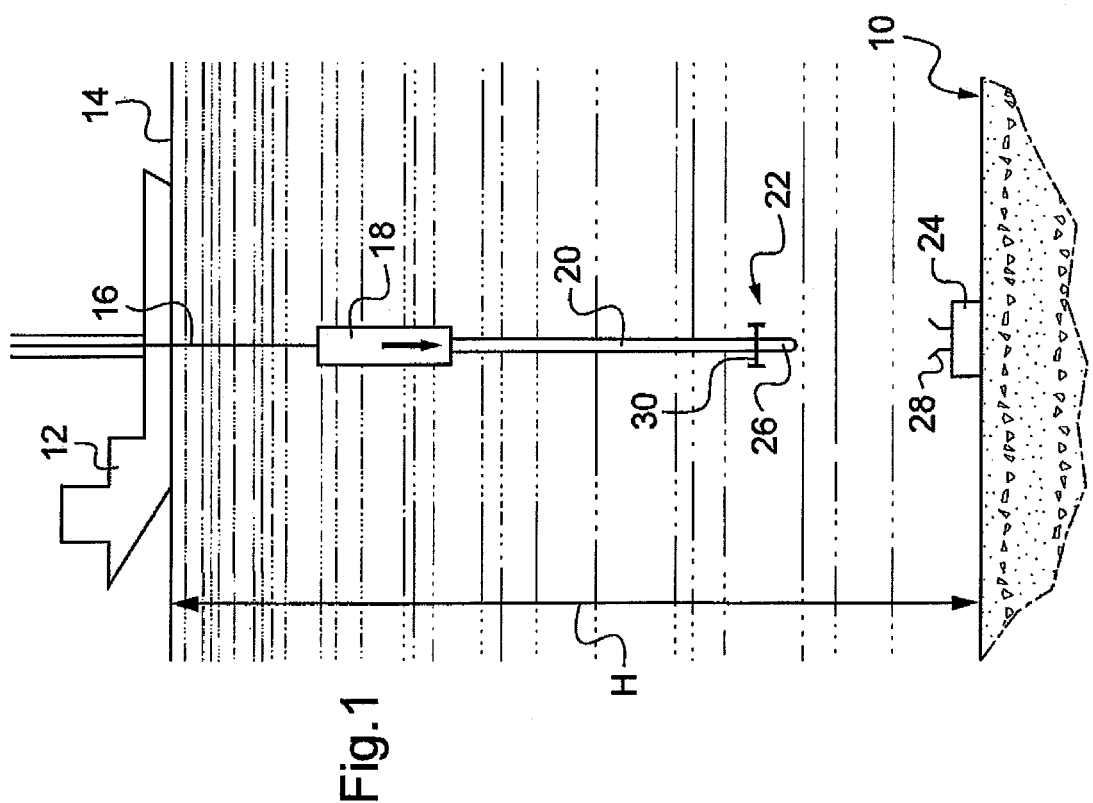
FIG. 1 is a schematic view of the method of installing a subsea riser according to the invention, according to a first step of installation.

FIG. 1 schematically illustrates a sea bed 10 covered with a depth H of water, for example 2000 meters of water. Furthermore, a surface vessel 12 is floating at the surface 14 of the water. The surface vessel 12 has means for driving the translational movement of a suspension cable 16 from which a float 18 is suspended. A longitudinal tubular pipe 20 is itself suspended from the float 19 in the continuation of the suspension cable 16. The longitudinal tubular pipe 20 has a connecting end 22 at the opposite end to the float 18. Furthermore, a seabed installation 24 is anchored to the sea bed 10 and therefore submerged. The elements depicted in this FIG. 1, like those in the other figures incidentally, are not drawn to scale and are drawn simply to explain as clearly as possible in the remainder of the description, the method of installing a subsea riser according to the invention. The subsea riser notably comprises the longitudinal tubular pipe 20, itself also sometimes known as a "riser", and the float 18.

The float 18 which has cylindrical geometry with a circular base of a diameter ranging between four and six meters, for example of five meters, and a height ranging between 20 and 40 meters, for example of 35 meters, namely measuring between 250 m³ and 1130 m³, can be filled with water. To do this, the float 18 has inlet valves, not depicted, actuation of which can be controlled from the surface vessel 12. In that way, when the float 18 is immersed in the water from the surface vessel 12 via the suspension cable 16, by making the inlet valves open, water can enter it and it is driven under the action of its own weight toward the sea bed 10. Moreover, the float 18 or the surface vessel are equipped with pumping means, not depicted, for example pumps, for removing the water it contains once it has been filled with water and submerged, and especially for injecting dry air or nitrogen in place of the removed water. For example, the pumping means are installed on the surface vessel and umbilicals connect these pumping means to the float. Advantageously, the gas is also stored on the surface vessel 12 and can be carried to the float 18 along umbilicals running along the suspension cable 16. Thus, by removing water from the float 18 and replacing it with a gas which is lighter than water, the float 18 experiences a reduction in its overall density which becomes lower than that of the water surrounding it, thus causing it to be driven toward the surface. The way in which these characteristics are put to use in order to apply the method of installation according to the invention will be explained hereinafter.

Moreover, the float 18 is therefore filled with water as explained hereinabove and the longitudinal tubular pipe 20 is itself full of water so that it runs substantially vertically and is suspended from the float 18 substantially vertically in line with the seabed installation 24. Thus, the float 18 and the tubular pipe 20 then apply tension to the suspension cable 16 that is equivalent to their own weight, for example 500 000 newtons. That corresponds to a tensile force of more or less 50 metric tonnes. Also, the connecting end 22 of the longitudinal pipe 20 at its free end has a male element 26 while the seabed installation 24 has a flared female element 28 designed to accept the male element 26 so that the connection of the connecting end 22 with the seabed installation 24 can be adjusted.

Figure 2:
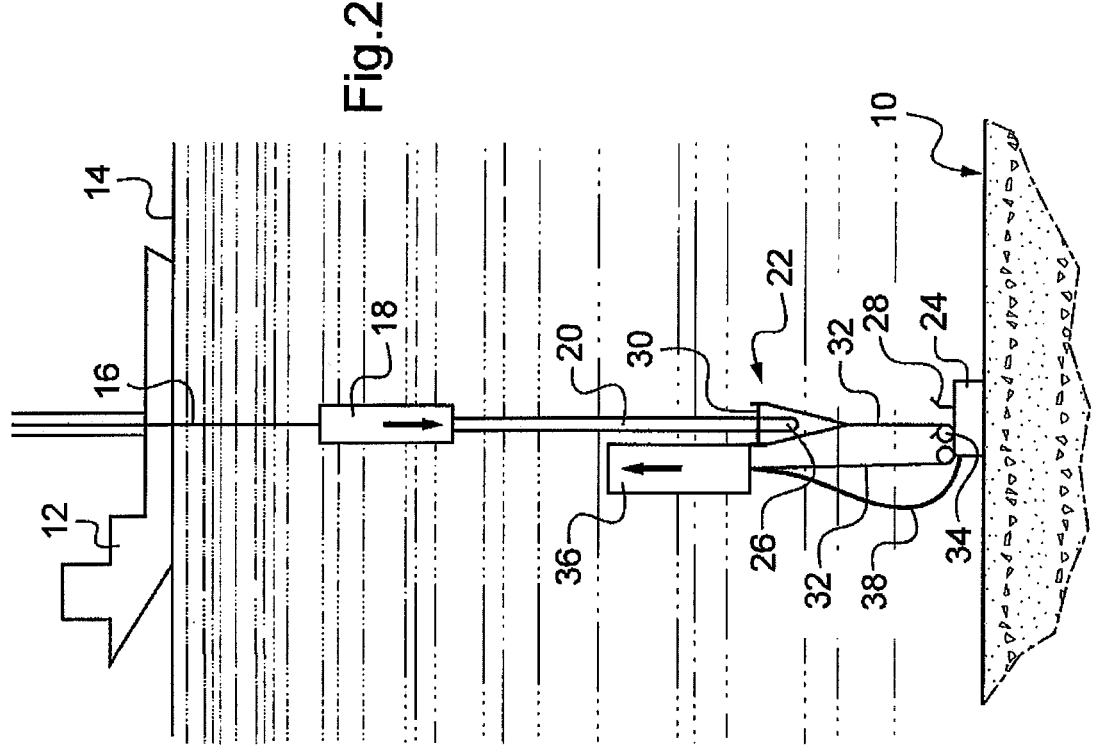
FIG. 2 is a schematic view of the method of installation according to the invention, according to a second step of installation.

In addition, the connecting end 22 is equipped with means 30 forming a balance beam situated to the rear of the male element 25 and to which pulling cables 32 that will now be described with reference to FIG. 2 can be attached. This FIG. 2 again shows all the elements depicted in FIG. 1. In addition, it shows return means 34 for the pulling cables 32 comprising pulleys and a pulling buoy 36.

This pulling buoy 36 is submersible and, just like the float 18, comprises inlet valves, not depicted, that can be controlled from the surface. Likewise, it comprises pumping means, for example pumps, not depicted, for removing the water contained in the pulling buoy, and means of injecting gas to replace the removed water. All these means can of course be controlled from the surface. It will also be noted that the upthrust applied to the pulling buoy 36 with all of its water emptied out and filled with air or with nitrogen, is high enough to apply an upward pulling force of between 400 000 newtons and 800 000 newtons, for example of 600 000 newtons, namely the equivalent of approximately 60 metric tonnes. Thus, beforehand, the pulling buoy 36 was submerged from the surface, for example from the surface vessel 12 under the action of its own weight and having been filled with water, it was guided and held for example by a pulling buoy cable, so as to be brought into vertical alignment with the seabed installation 24 and in the vicinity thereof.

It is then connected to the pulling cables 32 which run from the balance beam 30 of the connecting end 22 as far as the seabed installation 24 passing through the female element 28 and then the return pulleys 34 before then returning in the opposite direction to the pulling buoy 36. Advantageously, the pulling buoy 36 and the seabed installation 24 are connected by a line 38 of a defined length. This line 38, as will be explained hereinafter, allows the pulling buoy 36 to be kept a set distance from the seabed installation 24. Advantageously, the line 38 also holds the pulling buoy 36 in position when submerged beforehand.

Next, all of the water contained in the pulling buoy 36 is completely removed and replaced by a gas, in this instance by air, while the tubular pipe 20 and the float 18 are still, through their combined weight, applying tension to the suspension cable 16. Thus, the pulling buoy 36 rises up toward the surface 14 thereby driving the pulling cables 32 and as a result, thanks to the return pulleys 34, applying to the connecting end 32, and in the opposite direction, an additional tensile force substantially equivalent to 600 000 newtons. This tension is added to the tension already applied to the suspension cable 16 of the float 18 and of the pipe 20 and which in this instance is of about 500 000 newtons. The total tensile forces are thus around 1 100 000 newtons. It may be seen that, in this position, the line 38 is slack and does not take up any tension from the pulling buoy 36.

Starting out from this position in which the suspension cable 16 is bearing both the weight of the float 18 and of the tubular pipe 20 and also the tensile force applied by the pulling buoy 36 via the pulling cables 32, the pumping-out of the water contained in the float 18 is commenced. The water in this instance is replaced with dry air. Thus, for example, 80 cubic meters of water is removed from the float and replaced by 80 cubic meters of air. Thus, according to Archimedes' principle, these 80 cubic meters of air correspond to an upward thrust of around 800 000 newtons which is applied to the float 18 and is able to take up all of the weight of the float 18 and of the pipe 20 and, in addition, half of the 600 000 newtons applied by the pulling buoy 36 via the pulling cable 32, i.e. 300 000 newtons. As a result, the tensile force applied to the suspension cable 16 is around 300 000 newtons and is due to the difference between the opposing forces applied by the float 18 and by the pulling buoy 36 respectively.

Figure 3:
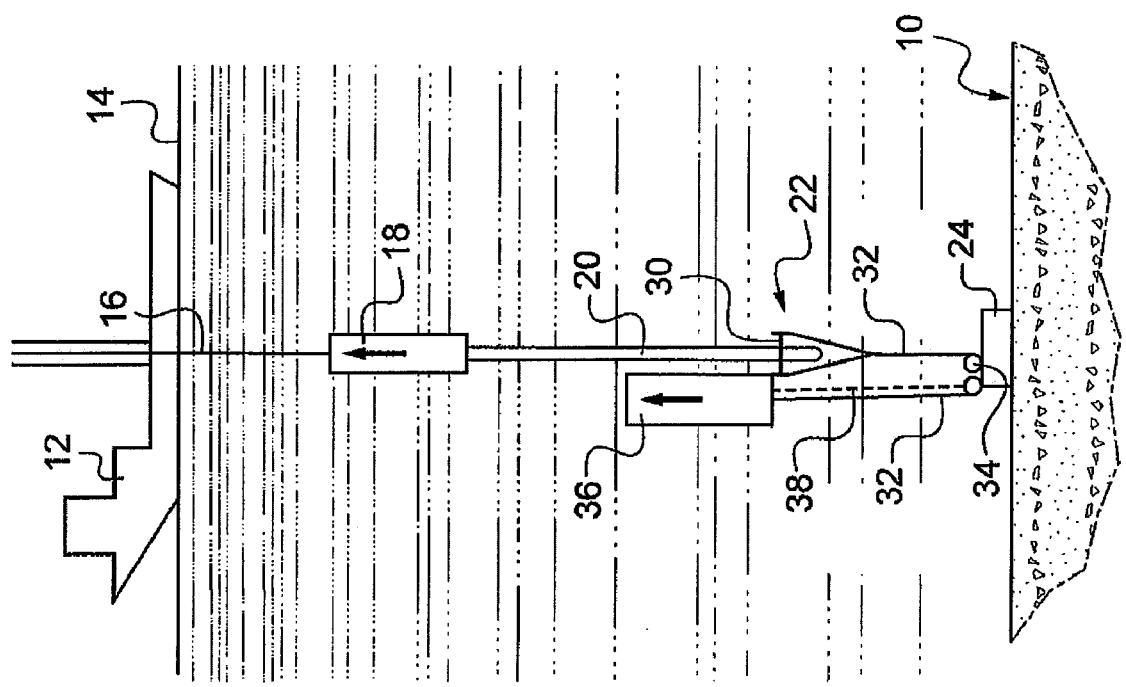
FIG. 3 is a schematic view of the method of installation according to the invention, according to a third step of installation.

Next, the suspension line 16 is gradually paid out so as to drive the float 18 and the pipe 20 toward the seabed installation 24. This causes the line 38 connecting the seabed installation 24 and the pulling buoy 36 to become taut until it takes up all of the tensile force of about 600 000 newtons of the pulling buoy 36 which then becomes immobilized, as illustrated in FIG. 3. As soon as the line 38 has taken up all of the tensile force of the pulling buoy 36, it becomes immobilized and, as a result, the tension applied to the suspension cable 16 becomes zero. The reason for this is that the float 18, which is still applying an upward thrust of around 800 000 newtons, takes up not only the force due to the weight of the pipe 20 and of the float 16, which represents around 500 000 newtons, which corresponds to a tension of around 300 000 newtons in the pulling cable 32. At the same time, the float 18 applies a tension of around 300 000 newtons to the pipe 20 which is therefore held vertically.

Thus, known guide means are used to control the ascent of the pulling buoy 36 once the line 38 that is used to connect it to the seabed installation 24 has been broken.

Obviously, the values given for tensile forces are merely indicative and could differ for a different size of float and buoy.

Furthermore, according to an advantageous alternative form of the invention, additional return members are provided, these being secured to a baseplate anchored in the sea bed some distance from the seabed installation. These elements are not illustrated but can easily be imagined from studying FIG. 3. For example, said baseplate is anchored to the sea bed a distance of 50 m away from the seabed installation 24. Thus, the pulling buoy 36 is then connected to the pulling cables 32. These pulling cables run from the balance beam 30 to the seabed installation 24 passing through the return pulleys 34 in order then to arrive at the additional return members followed by the pulling buoy 36. In that way, the pulling cables 32 run substantially horizontally first of all, between the seabed installation 24 and the additional return members, and then run vertically between these additional return members and the pulling buoy 36. In addition, the pulling buoy 36 is connected by the line 38 not to the seabed installation 24, but directly to the aforementioned baseplate. In that way, the controlled ascent of the pulling buoy 36, once the line 38 has been broken and, conversely, the descent of the float 18 and of the connecting end 22 toward the seabed installation 24 take place at distances that correspond, in a horizontal direction, to the distance separating the seabed installation 24 and the baseplate from the additional return members. Thus, the risks of collision between the pulling buoy 36 and the on-coming elements of the longitudinal pipe 20 disappear.

According to one implementation of the invention that has not been depicted, when the pipe and the float are in a position as depicted in FIG. 1, the connecting end of the pipe is connected to a deadweight placed on the sea bed, using a connecting cable.

Figure 4:
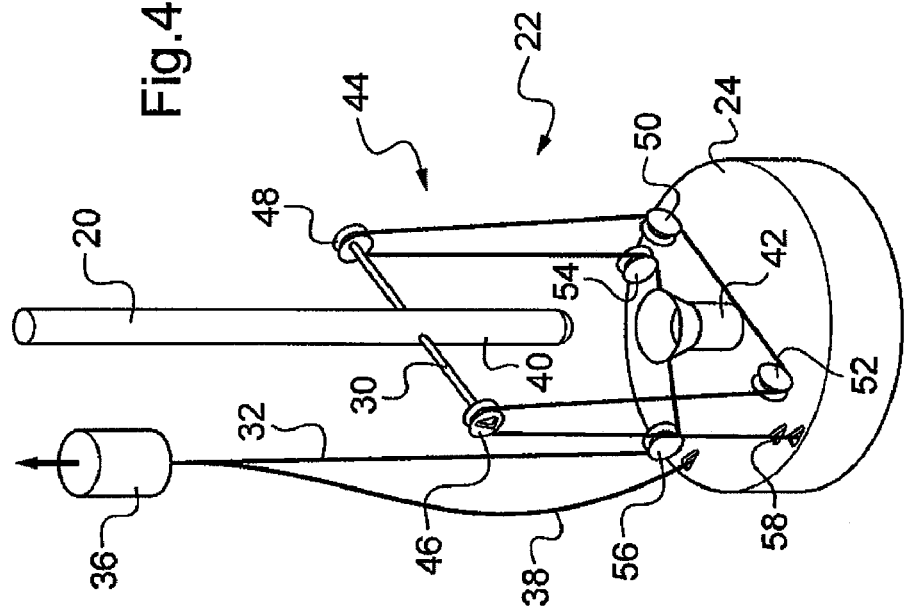
FIG. 4 is a schematic detailed view of one element of the subsea riser shown in FIG. 3.

Reference will now be made to FIG. 4 which depicts in detail the seabed installation 24 to which the connecting end 22 is connected. Furthermore, it again shows the balance beam 30 and a male element 40 of the pipe 20, as well as a female element 42 of the seabed installation 24. Moreover, the installation is equipped with means 44 forming a block and tackle to step down the tensile forces applied by said pulling buoy 36. Thus, two coaxial pulleys 46, 48 are mounted respectively at the ends of the balance beam 30 and two pairs of pulleys 50, 52; 54, 56 are installed on each side of said female element 42. In that way, the pulling cable 32 is first of all anchored to the seabed installation 24 at an anchor point 58. It is then passed through one of the pulleys 45 of the coaxial pulleys to return to one of the pairs of pulleys 52, 50 and is then passed around the other coaxial pulley 48. Finally, the cable enters the second pair of pulleys 54, 56 before then arriving at the pulling buoy 36.

In that way, the forces that the pulling buoy 36 has to apply to the pulling cable in order to drive the connecting end 22 of the pipe 20 toward the seabed installation are reduced.

The invention claimed is:

1. A method of installing a subsea riser for carrying hydrocarbons between a sea bed and a surface, said method comprising:
   installing a seabed installation anchored to said sea bed;
   connecting a pipe connecting end to said seabed installation and providing an opposite end of said connecting pipe with a submersible float;
   permitting water to enter said float submerging said float and said connecting pipe while holding said float and said pipe by a suspension line from a surface vessel, wherein said suspension line bears tensile forces corresponding to the weight of said float and of said pipe;
   installing a pulling cable and a return device on said seabed installation and connecting said pulling cable to said connecting end of said pipe, driving said cable on said return device and driving said connecting end toward said seabed installation;
   attaching a submerged pulling buoy to said pulling cable applying additional tensile forces to said suspension line;
   then supplying a gaseous fluid in said float to compensate for tensile forces corresponding to the weight of said float and of said pipe and for at least some of the additional tensile forces; and
   anchoring said pulling buoy to said seabed installation, and gradually releasing said suspension line from said seabed installation so that said seabed installation takes up said additional tensile forces applied by said pulling buoy, whereas said float applies a remainder of said additional tensile forces to said pipe in order to hold it vertically.

2. The method of installation as claimed in claim 1, wherein said gaseous fluid is supplied by being substituted for the water in said float to compensate for said tensile forces corresponding to the weight of said float and substantially to half said additional tensile forces.

3. The method of installation as claimed in claim 1, wherein said pulling buoy is released from said seabed installation for permitting said pulling buoy to rise toward said surface to drive said connecting end of said pipe in the opposite direction, toward said seabed installation.

4. The method of installation as claimed in claim 3, further comprising attaching said pulling buoy to a guide thereby guiding the ascent of said pulling buoy toward said surface.

5. The method of installation as claimed in claim 4, wherein said guide comprise a subsea hoist.

6. The method of installation as claimed in claim 1, further comprising providing said connecting end with a male element and said seabed installation with a female element which accepts said male element.

7. The method of installation as claimed in claim 1, further comprising permitting water to enter said pulling buoy for submerging said pulling buoy, and thereafter substituting a gaseous fluid for the water in said pulling buoy to release said pulling buoy.

8. The method of installation as claimed in claims 1, wherein said cable return device comprises a block and tackle installed on said seabed installation for driving said cable.

9. The method of installation as claimed in claim 1, further comprising installing a baseplate anchored in said sea bed and some distance from said seabed installation, anchoring in said sea bed additional return members secured to said baseplate, and driving said pulling cable both through said return device and through said additional return members.

10. The method of installation as claimed in claim 1, wherein said float and said pipe are submerged vertically in line with said seabed installation.

* * * * *